June 14, 1960        A. MURASZEW        2,940,516
FUEL SYSTEM INCLUDING AN EMERGENCY FUEL CONTROL UNIT
Filed Nov. 4, 1957        2 Sheets-Sheet 2
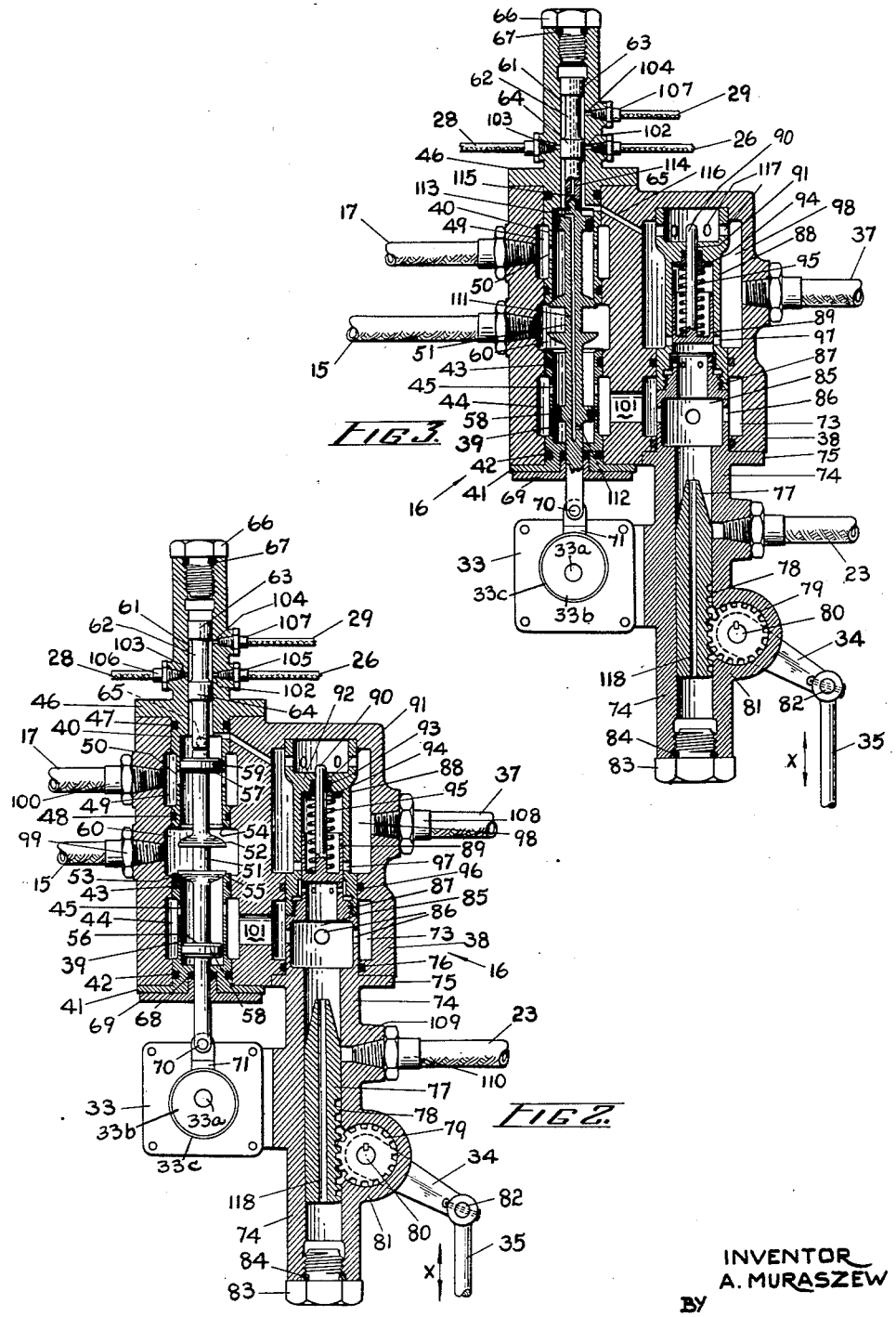
INVENTOR
A. MURASZEW
BY
Maybee & Legris
ATTORNEYS

United States Patent Office 2,940,516
Patented June 14, 1960

2,940,516
FUEL SYSTEM INCLUDING AN EMERGENCY FUEL CONTROL UNIT

Alexander Muraszew, Clarkson, Ontario, Canada, assignor to Orenda Engines Limited, Malton, Ontario, Canada Filed Nov. 4, 1957, Ser. No. 694,364

3 Claims. (Cl. 158—36.3)

This invention relates to an engine fuel system including a variable flow fuel pump, normal controls for use under normal operating conditions and an emergency fuel control unit for operation in emergencies. The invention has application to the fuel systems of aero-engines and in particular to the fuel systems of gas turbine engines commonly used in aircraft.

In normal aero-engine practice, fuel is supplied to the engine by twin high pressure pumps, working in parallel, which deliver fuel to the engine via a series of normal fuel controls. Each pump has a servo control operable to vary the flow of the pump, which is normally effected by varying the stroke of the pump. The flow of the pumps is controlled in dependence upon the pressure in a servo system which is connected to the servo controls of the pumps and also to the normal fuel controls. Some of the normal fuel controls are operated by a conscious action on the part of the pilot and some of the controls are operated automatically in response to the values of such variables as the temperature in the jet pipe of the turbine, the altitude of the aircraft and the acceleration of the aircraft. Upon operation of these controls which are operated automatically, the pressure in the servo system is varied, thus adjusting the servo controls of the fuel pumps so that the fuel flow to the pilot operated controls is determined by the variables which influence the automatically operated controls. It follows that for any given setting of the pilot operated controls, the fuel flow to the engine will be determined by the automatically operated controls.

The normal fuel controls are comparatively complicated and, to enable the pilot to return home safely when one of the normal controls fails, an emergency system must be provided. Heretofore emergency control systems have taken one of two forms. In one form the complete servo control system has been isolated in an emergency and the fuel pumps run at stall pressure. Since the stall pressure of a fuel pump is very high, i.e. between 2000 and 2200 lbs. per square inch, once the system has been run at stall pressure the complete fuel system has to be stripped and retested before it may be used again in the normal manner.

In the second previously proposed system, one of the normal controls is used as the sole engine control when on the emergency system. This has the drawback, which is also common to the first system, that it does not provide for failure of all the normal controls.

An object of the invention is to provide a fuel system having an emergency fuel control unit which may be brought into operation to bypass all the normal fuel controls and to provide an adjustable throttle to control the engine during an emergency.

A further object of the invention is to provide a fuel system having an emergency fuel control unit and in which it is not necessary to run the fuel pumps at stall pressure during emergency operation.

The invention will be described by way of example with reference to the accompanying drawings in which like reference numerals indicate like parts throughout the several views, and in which:

Figure 2 is a vertical sectional view of the emergency fuel control unit shown in Figure 1 in a first position of operation, and Figure 3 is a sectional view similar to Figure 2 showing the emergency fuel control unit in a second position of operation.

Figure 1:
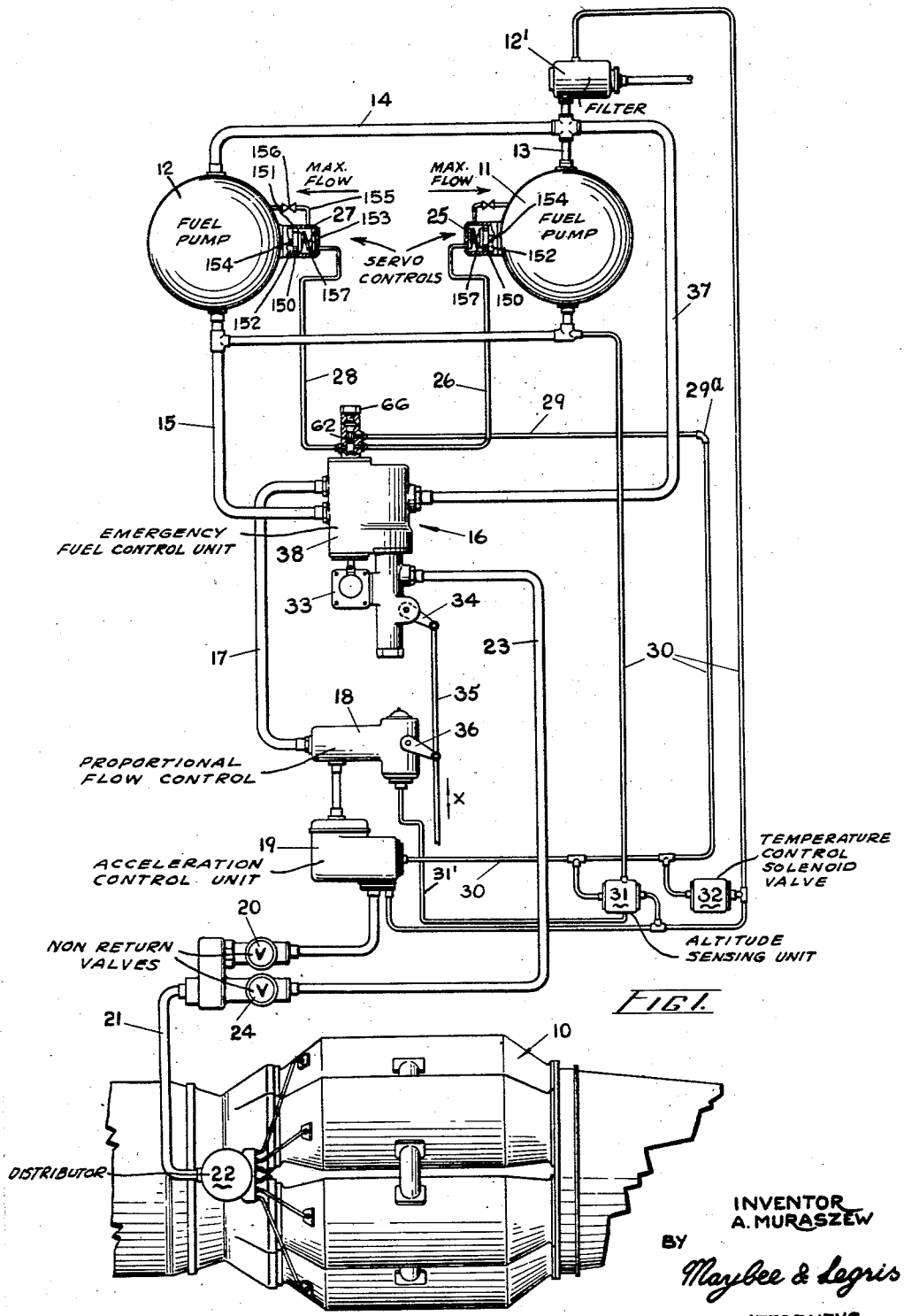
Figure 1 is a schematic diagram of an aero-engine fuel system according to the invention, parts of the system being broken away to show the internal mechanism and the broken away parts being shown in the positions they occupy when the fuel system is operating in an emergency.

Referring now to Figure 1, a gas turbine engine indicated at 10 is supplied with fuel by twin fuel pumps 11 and 12. The fuel pumps draw fuel from a supply (not shown) through a filter 12' and feed pipes 13 and 14. The fuel pumps deliver in parallel to a fuel inlet conduit 15 which delivers fuel to an emergency fuel control unit indicated generally at 16.

A first fuel outlet conduit 17 leads from the emergency fuel control unit 16 through a proportional flow control 18, an acceleration control unit 19, a first non-return valve 20, a fuel delivery conduit 21 and a distributor 22 to the engine 10. The proportional flow control 18 includes a variable throttle and a flow transformer. The flow transformer splits the fuel flow into a main flow and a secondary flow and maintains the ratio between the main and secondary flows constant throughout variations of the total flow. As hereinafter described, the secondary flow is used to vary the pressure in a servo system thereby to control the output of the pumps 11 and 12. A fuller description of a proportional flow control and its associated controls is to be found in an article entitled "Fuel Control and Burning in Aero-Gas-Turbine Engines," by E. A. Watson in "The Chartered Mechanical Engineer," of February 1956, pages 91 to 127. A second fuel outlet conduit 23 delivers fuel from the emergency fuel control unit 16 to a second non-return valve 24 and from thence along the fuel delivery conduit 21 to the distributor 22 and the engine 10.

The pump 11 has a servo control 25 and a first servo conduit 26 leads from the servo control 25 to the emergency fuel control unit 16. The fuel pump 12 has a servo control 27 and a second servo conduit 28 leads from the servo control 27 to the emergency fuel control unit 16. A third servo conduit 29 is connected at 29a to a servo system 30 which is supplied with fuel under pressure from the pumps 11 and 12 and is connected to an altitude sensing unit 31, the acceleration control unit 19, and a temperature control solenoid valve 32. The servo system discharges to the filter 12'. The secondary flow from the proportional flow control passes along line 31' to the altitude sensing unit and thence to the filter 12' via the servo return line.

Operation of the acceleration control unit 19, the altitude sensing unit 31 and the temperature control solenoid valve 32 varies the pressure in the servo system and hence varies the pressure in the third servo conduit 29. The secondary flow from the proportional flow control is also operative in the altitude sensing unit to alter the pressure in the servo system and hence the output of the pumps 11 and 12.

The servo control 27 comprises a piston 150 slidable in a cylinder 151; the piston divides the cylinder into two chambers 152, 153. Connected to the piston 150 is a piston rod 154 which passes through the chamber 152 and is connected to means (not shown) within the pump for varying the flow thereof. When the piston moves towards the left the pump is adjusted for increased flow and when the piston moves towards the right the pump is adjusted for decreased flow. If the piston moves to the limit of its travel in a leftward direction the pump is adjusted for maximum flow.

The chamber 152 is exposed to the full delivery pressure of the pump. The chamber 153 is also in communication with the delivery pressure of the pump via a conduit 155 having a restriction 156 therein. A compression spring 157 is located in the chamber 153 and tends to force the piston to the left, i.e. towards a position of maximum flow; the servo conduit is also connected to the chamber 153. When the servo conduit 28 is in communication with the servo system 30, the pressure in the chamber 153 will vary in dependence on the pressure in the servo system 30, and the piston, and hence the flow of the pump, will be adjusted in dependence on the servo pressure. However, when the conduit 28 is blocked, by means which will hereinafter be described, the outlet from the chamber 153 is blocked and therefore the pressure in the chamber 153 will build up to the delivery pressure of the pump. When the pressures in the chambers 152, 153 are equal, since the area of the piston 150 exposed to the pressure in the chamber 153 is greater than the area of the piston exposed to the pressure in the chamber 152, the piston will move to the left to the limit of its travel and will adjust the pump for maximum flow.

The servo control 25 is similar to the control 27 and the same reference numerals have been used to indicate the parts thereof. In the servo control 25 the piston 150 moves to the right for maximum flow and the chamber 153 is connected to the servo conduit 26. The servo conduit 26 is cut off in the same way as the servo conduit 28 when it is desired to adjust the pump for maximum flow.

A rotary actuator 33 is operable by the pilot to change the emergency control unit from a first, normal, position to a second, emergency, position. The actuator consists of an electric motor having a shaft 33a upon which is rotatably mounted an eccentric 33b. The eccentric is embraced by a collar 33c to which is fixed an arm 71. The motor is controlled by a switch (not shown) under the control of the pilot. An arm 34, which is connected to an adjustable throttle in the emergency fuel control, is also connected by a rod 35 to an arm 36 which controls the throttle in the proportional flow control 18. The rod 35 leads from the arm 36 to the pilot's throttle control and operation of the rod 35 will move the arms 34 and 36 in unison. A fuel return conduit 37 leads from a pressure relief valve in the unit 16 to the junction of the fuel pipes 13 and 14.

Referring to Figures 2 and 3, the emergency fuel control unit will now be described in detail. The emergency fuel control unit comprises a body 38 which is bored to receive a lower sleeve 39 and an upper sleeve 40. The lower sleeve 39 is provided with a flange 41 which abuts the body 38 and is also provided with sealing glands 42 and 43 so that the sleeve is a liquid-tight fit in the body. The body 38 and the sleeve 39 are recessed to provide an annular passage 44 which communicates with the interior of the sleeve 39 through ports 45.

The upper sleeve 40 is provided with a flange 46 which abuts against the body 38 and is provided with sealing glands 47 and 48 so that the sleeve 40 is a liquid-tight fit in the body 38. The body 38 and sleeve 40 are recessed to form an annular passage 49 which communicates with the interior of the sleeve 40 by ports 50.

Slidable in the bores of the sleeves 39 and 40 is a first valve member indicated generally at 51. The valve member is provided with conical lands 52, 53 and the sleeves 39 and 40 are provided with valve seatings 54, 55. The valve member 51 also carries pistons 56, 57 which serve as guides for the valve member and are in liquid-tight engagement with the bores of the sleeves through packings 58, 59. The bores of the sleeves 39, 40 together with a cylindrical chamber 40 in the body between the adjacent ends of the sleeves constitute a first bore in which the first valve member 51 is slidable.

A second bore 61 is provided in the sleeve 40 and a second valve member 62 is slidable in the bore 61. The valve member 62 has lands 63 and 64 which are lapped fits in the bore 61. A universal joint 65 inter-connects the first and second valve members. The open end of the bore 61 is sealed by a screw plug 66 having a sealing washer 67.

A gland 68 is provided around the lower end of the valve member 51 and is kept in place by a flanged plate 69. The lower end of the valve member 51 is pivotally connected at 70 to the arm 71 of the rotor of the rotary actuator 33. When the actuator is operated, the shaft 33a turns and the valve members 51 and 62 are slid up or down in unison between a first position, shown in Figure 2, and a second position shown in Figure 3.

The body is also provided with a cylindrical chamber 73 into which projects one end of a sleeve 74 provided with a flange 75 which abuts the body. The sleeve 74 is provided with a packing 76 to ensure that it is in liquid-tight engagement with the body 38. Mounted in the bore of the sleeve 74 is an adjustable throttle 77 which is provided with a toothed rack 78 arranged to mesh with a toothed pinion 79 mounted on a spindle 80 and accommodated in a protuberance 81 on the sleeve 74. The spindle 80 is connected to the arm 34 and the arm 34 is connected by a pivot pin 82 to the rod 35 so that movement of the rod in the directions of the arrows "X" will move the throttle in the bore of sleeve 74. The lower end of the sleeve 74 is closed by a screw plug 83 having a sealing washer 84.

The upper portion of the sleeve 74 is provided with a cylindrical chamber 85 which communicates with the chamber 73 through ports 86. The upper end of the sleeve 74 is provided with an external screw thread 87 which engages with an internal screw thread on the lower end of a sleeve 88 which provides the housing of a pressure relief valve.

A valve piston 89 is slidable in the bore of the sleeve 88 and has an upstanding piston rod 90. The piston rod 90 is guided in a bore 91 in a web 92 of the sleeve 88. A gland 93 surrounds the piston rod 90 and is retained in place by a flanged sleeve 94. A compression spring 95 abuts at its upper end against the flange of the sleeve 94 and at its lower end against the piston 89. The upper end of the sleeve 74 provides a seating for the piston 89 which is biased against its seat by the spring 95. A gland 96 surrounds the sleeve 88 and ensures that it is a liquid-tight fit in the body 38. Ports 97 are in communication with a chamber 98 surrounding the major portion of sleeve 88. The ports are normally closed by the piston 89 but, if the piston is lifted off its seat against the spring 95, the ports 97 allow fluid to pass from the inside of the sleeve 74 through the ports 97 into the chamber 98.

A union 99 connects the fuel inlet conduit 15 to the body 38 so that fuel from the conduit may pass into the cylindrical chamber 60. The union 99 thus provides a fuel inlet to the first bore constituted by the bores of the sleeves 39 and 40 and the chamber 60.

A first fuel outlet from the first bore is provided by a union 100 in communication with the annular passage 49, the union being connected to the first fuel outlet conduit 17. A second fuel outlet from the first bore is provided by a conduit 101 which extends between the annular passage 44 and the cylindrical chamber 73.

Three servo ports open into the second bore 61 and are indicated at 102, 103, 104. The servo port 102 is connected to the first servo conduit 26 by union 105, the servo port 103 is connected to the second servo conduit 28 by a union 106 and the servo port 104 is connected to the third servo conduit 29 by a union 107.

The chamber 98 is in communication with the fuel return conduit 37 via a union 108. A boss 109 on the sleeve 74 accommodates a union 110 which connects the second fuel outlet conduit 23 to the outlet from the adjustable throttle 77.

In order that the valve members 51 and 62 shall be easily movable in their bores they are provided with balance bores to equalize the pressures on the ends of the valve members. The body is also provided with balance bores for the same purpose. Referring to Figure 3, the valve member 51 is provided with a longitudinal bore 111 and a transverse bore 112 communicating with the bore 111 and with the bore of the sleeve 39 below the piston 56. The valve member 51 is also provided with a transverse bore 113 which is in communication with the bore of the sleeve 40 above the piston 57. Thus the pressures on the ends of the valve member 51 may be equalized through the bores 111, 112, 113. Similarly, the valve member 62 is provided with a longitudinal bore 114 communicating with its upper end and also with a transverse bore 115 which communicates with the bore of the sleeve 40. The pressures on the ends of the valve member 61 are therefore balanced through the bores 114, 115. A bore 116 in the body 38 together with ports 117 in a recessed upper portion of the sleeve 88 ensure that the top of the piston rod 90 is also subjected to a balancing pressure. The throttle 77 is provided with a longitudinal balancing bore 118 so that there is no static pressure to retard the movement of the throttle.

The operation of the fuel system and emergency fuel control unit is as follows: Under normal operating conditions the emergency fuel control unit is in its first position as shown in Figure 2. Fuel is pumped by the pumps 11 and 12 from the fuel supply and is delivered to the emergency fuel control unit along the fuel inlet conduit 15 into the cylindrical chamber 60.

Referring now to Figure 2, the fuel passes upwardly from the cylindrical chamber 60 along the bore of the upper sleeve 40, between the valve seating 54 and the land 52 on the first valve member, through the ports 50, the annular passage 49 and the union 109 into the first fuel outlet conduit 17. The valve seating 55 is in contact with the land 53 on the first valve member and prevents fuel flowing downwardly through the sleeve 39.

The fuel flows along the first fuel outlet conduit 17 to the proportional flow control 18, through the acceleration control unit 19, the first non-return valve 20, the fuel delivery conduit 21 and the distributor 22 to the engine 10. The amount of fuel passed by the proportional flow control 18 is under the control of the pilot through his throttle control lever which acts on the rod 35 and hence on the arm 36. The outputs of the fuel pumps 11 and 12 are controlled in dependence on the pressure in the servo system 30. The acceleration control unit 19, the altitude sensing unit 31 and the temperature control solenoid valve 32 are operated automatically to adjust the pressure in the servo system and hence the servo controls 25, 27 to maintain the required fuel pressure in the fuel inlet conduit 15 in accordance with engine requirements, and altitude and temperature limitations.

When the first valve member 51 is in its first position, the second valve member 62 is also in the first position so that the first, second and third servo conduits 26, 28 and 29 are all in communication with one another along the second bore 61. Thus the pressure in the servo system, felt in the third servo conduit 29, is also felt in the first and second servo conduits 26, 28 and thus the piston 150 in the servo controls 25 and 27 can move to adjust the flows of the pumps. It will be seen, therefore, that in the first position of the emergency control unit the output of the fuel pumps is controlled in dependence on the pressure in the servo system which in turn is controlled by the normal controls.

If an emergency should arise, for example if the proportional flow control 18 should cease to function, or if the first fuel outlet conduit 17 should become fractured, or if for any other reason the normal controls should cease to function correctly, the pilot will operate the rotary actuator 33 to move the first and second valve members to their second position as shown in Figures 1 and 3. In this position fuel is delivered from the fuel pumps 11 and 12 along fuel inlet conduit 15 to the chamber 60 in the first bore. The fuel then passes downwardly along the bore of the lower sleeve 39 between the land 53 on the first valve member and the valve seating 55 on the sleeve 39.

The fuel passes through the ports 45 into the annular passage 44 and thence along the conduit 101 through the ports 86 into the chamber 85 in the sleeve 74. The fuel then flows downwardly past the throttle 77 out through the union 110 into the second fuel outlet conduit 23. It will be appreciated that the position of the throttle 77 may be adjusted by rotation of the pinion 79 via the arm 34 and the rod 35 thus controlling the amount of fuel which will pass into the second fuel outlet conduit 23. From the second fuel outlet conduit 23, the fuel passes through the second non-return valve 24, along the fuel delivery conduit 21 through the distributor 22 to the engine 10.

With the first valve member 51 in its second position, the land 52 cooperates with the valve seating 54 to prevent fuel flowing upwardly through the upper sleeve 40 and out along the first fuel outlet conduit 17. Moreover, as the first valve member is moved to the second position the second valve member is also moved to the second position. In the second position of the second valve member the land 64 blocks the servo ports 102, 103 and isolates them from the servo port 104 which, in effect, is also blocked. Thus when the second valve member is in its second position the pressure in the servo system is no longer felt by the servo pump controls 25, 27. When the servo conduits 26, 28 are blocked the pistons 150 in the servo controls assume positions in which the fuel pumps are adjusted for maximum flow as described above. Thus the amount of fuel being delivered along the fuel inlet conduit 15 to the emergency fuel control unit is the sum of the maximum deliveries of both pumps and in most instances is more than is required by the engine.

When the fuel delivered to the emergency fuel control unit is more than is required by the engine, the excess fuel may escape through the pressure relief valve constituted by the piston 89 and its associated spring 95. Thus excess fuel flows from the chamber 85 upwardly through the sleeve 74 and lifts the piston 89 off its seating constituted by the end of the sleeve 74. When the piston 89 has lifted as shown in Figure 3, fuel will pass through the ports 97 into the chamber 98, through the union 108 to the fuel return conduit 37 and back to the inlet of the fuel pumps. As more fuel is taken by the engine and the pressure of the fuel in the chamber 85 drops, the piston 89 will seat once more on the end of the sleeve 74 and the pressure relief valve will close.

The amount of fuel passing to the engine when the emergency fuel control unit is in its second position will be determined solely by the setting of the throttle 77 which is determined by the position of the pilot's throttle control lever. Thus even when the throttle 77 is not being used, i.e., when the emergency fuel control unit is in its first position, the throttle will move in dependence on the position of the pilot's throttle control.

It will be seen that when the fuel control unit is in the position shown in Figure 3, all the normal controls are isolated and the servo system is also isolated, the only control being the throttle 77. Moreover, due to the presence of the non-return valves 20, 24, if the first fuel outlet conduit 17 has become fractured, fuel delivered along the second fuel outlet conduit will be prevented from escaping along the first fuel outlet conduit.

The lands 63, 64 are lapped fits in the bore 61 and therefore the universal joint 65 is provided to allow for any relative angular movement between the first and second valve members.

Normally the fuel pumps will be of the variable stroke type and the servo controls will consist of servo pistons so arranged that when the servo conduits are blocked the pressures on both sides of the servo pistons are equal and the fuel pumps are adjusted to give full stroke. It will be appreciated that the flow of the pumps can be controlled by varying their speed and that in this case the servo controls vary the speed of the pumps.

It will be seen that the invention provides a fuel system having an emergency fuel control unit which may be brought into operation quickly and which, when in operation, by-passes all the normal controls and isolates the servo system.

It will be understood that the form of the invention herewith shown and described is a preferred example and various modifications can be carried out without departing from the spirit of the invention or the scope of the appended claims.

What I claim as my invention is:

1. A fuel system for an engine, including a variable flow fuel pump, a servo control operable to vary the flow of said pump, a servo system, normal fuel controls for use under normal operating conditions, at least some of the normal controls being connected to the servo system and by their operation varying the pressure in the servo system, an emergency fuel control unit, a fuel inlet conduit from the fuel pump to the emergency fuel control unit, a first servo conduit from the emergency fuel control unit to the servo control which operates in response to the pressure in said first servo conduit and adjusts the fuel pump for maximum flow when said servo conduit is blocked, a second servo conduit from the emergency fuel control unit to the servo system, an adjustable throttle in the emergency fuel control unit, an inlet in said unit to the throttle, a pressure relief valve in communication with the inlet to the adjustable throttle, first and second non-return valves, a first fuel outlet conduit associated with the normal controls and extending from the emergency fuel control unit to the first non-return valve, the flow in said first fuel outlet conduit being controlled by the normal controls, a second fuel outlet conduit from the adjustable throttle to the second non-return valve, a fuel delivery conduit from the non-return valves to the engine, valve means in the emergency fuel control unit movable between a first position, in which the servo conduits are in communication with one another and fuel may pass from the fuel inlet conduit through the emergency fuel control unit, the first fuel outlet conduit, the first non-return valve and the fuel delivery conduit to the engine, and a second position in which the servo conduits are blocked and isolated from one another and fuel may pass from the fuel inlet conduit through the emergency fuel control unit, the adjustable throttle, the second fuel outlet conduit, the second non-return valve and the fuel delivery conduit to the engine, means to move the valve means and means to adjust the throttle.

2. A fuel system for an engine, including two variable flow fuel pumps, a servo control associated with each pump and operable to vary the flow of said pump, a servo system, normal fuel controls for use under normal operating conditions, at least some of the normal controls being connected to the servo system and by their operation varying the pressure in the servo system, an emergency fuel control unit, a fuel inlet conduit from the fuel pumps to the emergency fuel control unit, a first servo conduit from the emergency fuel control unit to the servo control associated with one of the fuel pumps, a second servo conduit from the emergency fuel control unit to the servo control associated with the other of the fuel pumps, the servo controls operating in response to the pressures in their respective servo conduits and adjusting the fuel pumps for full flow when said servo conduits are blocked, a third servo conduit from the emergency fuel control unit to the servo system, an adjustable throttle in the emergency fuel control unit, an inlet in said unit to the throttle, a pressure relief valve in communication with the inlet to the adjustable throttle, first and second non-return valves, a first fuel outlet conduit associated with the normal controls and extending from the emergency fuel control unit to the first non-return valve, the flow in said first fuel outlet conduit being controlled by the normal controls, a second fuel outlet conduit from the adjustable throttle to the second non-return valve, a fuel delivery conduit from the non-return valves to the engine, valve means in the emergency fuel control unit movable between a first position, in which all said servo conduits are in communication with one another and fuel may pass from the fuel inlet conduit through the emergency fuel control unit, the first fuel outlet conduit, the first non-return valve and the fuel delivery conduit to the engine, and a second position in which all said servo conduits are blocked and isolated from one another and fuel may pass from the fuel inlet conduit through the emergency fuel control unit, the adjustable throttle, the second fuel outlet conduit, the second non-return valve and the fuel delivery conduit to the engine, means to move the valve means and means to adjust the throttle.

3. A fuel system for an engine, including two variable flow fuel pumps, a servo control associated with each pump and operable to vary the flow of said pump, a servo system, normal fuel controls for use under normal operating conditions, at least some of the normal controls being connected to the servo system and by their operation varying the pressure in the servo system, an emergency fuel control unit, a fuel inlet conduit from the fuel pumps to the emergency fuel control unit, a first servo conduit from the emergency fuel control unit to the servo control associated with one of the fuel pumps, a second servo conduit from the emergency fuel control unit to the servo control associated with the other of the fuel pumps, the servo controls operating in response to the pressures in their respective servo conduits and adjusting the fuel pumps for full flow when said servo conduits are blocked, a third servo conduit from the emergency fuel control unit to the servo system, an adjustable throttle in the emergency fuel control unit, an inlet in said unit to the throttle, a pressure relief valve in communication with the inlet to the adjustable throttle, a fuel return conduit to return the overspill of the pressure relief valve to the fuel pumps, first and second non-return valves, a first fuel outlet conduit associated with the normal controls and extending from the emergency fuel control unit to the first non-return valve, the flow in said first fuel outlet conduit being controlled by the normal controls, a second fuel outlet conduit from the adjustable throttle to the second non-return valve, a fuel delivery conduit from the non-return valves to the engine, valve means in the emergency fuel control unit movable between a first position, in which all said servo conduits are in communication with one another and fuel may pass from the fuel inlet conduit through the emergency fuel control unit, the first fuel outlet conduit, the first non-return valve and the fuel delivery conduit to the engine, and a second position in which all said servo conduits are blocked and isolated from one another and fuel may pass from the fuel inlet conduit through the emergency fuel control unit, the adjustable throttle, the second fuel outlet conduit, the second non-return valve and the fuel delivery conduit to the engine, means to move the valve means and means to adjust the throttle.

References Cited in the file of this patent

UNITED STATES PATENTS

| | | |
|---|---|---|
| 2,742,924 | Harter | Apr. 24, 1956 |
| 2,788,063 | Wright | Apr. 9, 1957 |

FOREIGN PATENTS

| | | |
|---|---|---|
| 508,663 | Canada | Dec. 28, 1957 |